Aug. 5, 1924.
A. KERSHAW
1,503,793
INTERMITTENT MOVEMENT FOR PROJECTORSCOPES
Filed Nov. 4, 1921
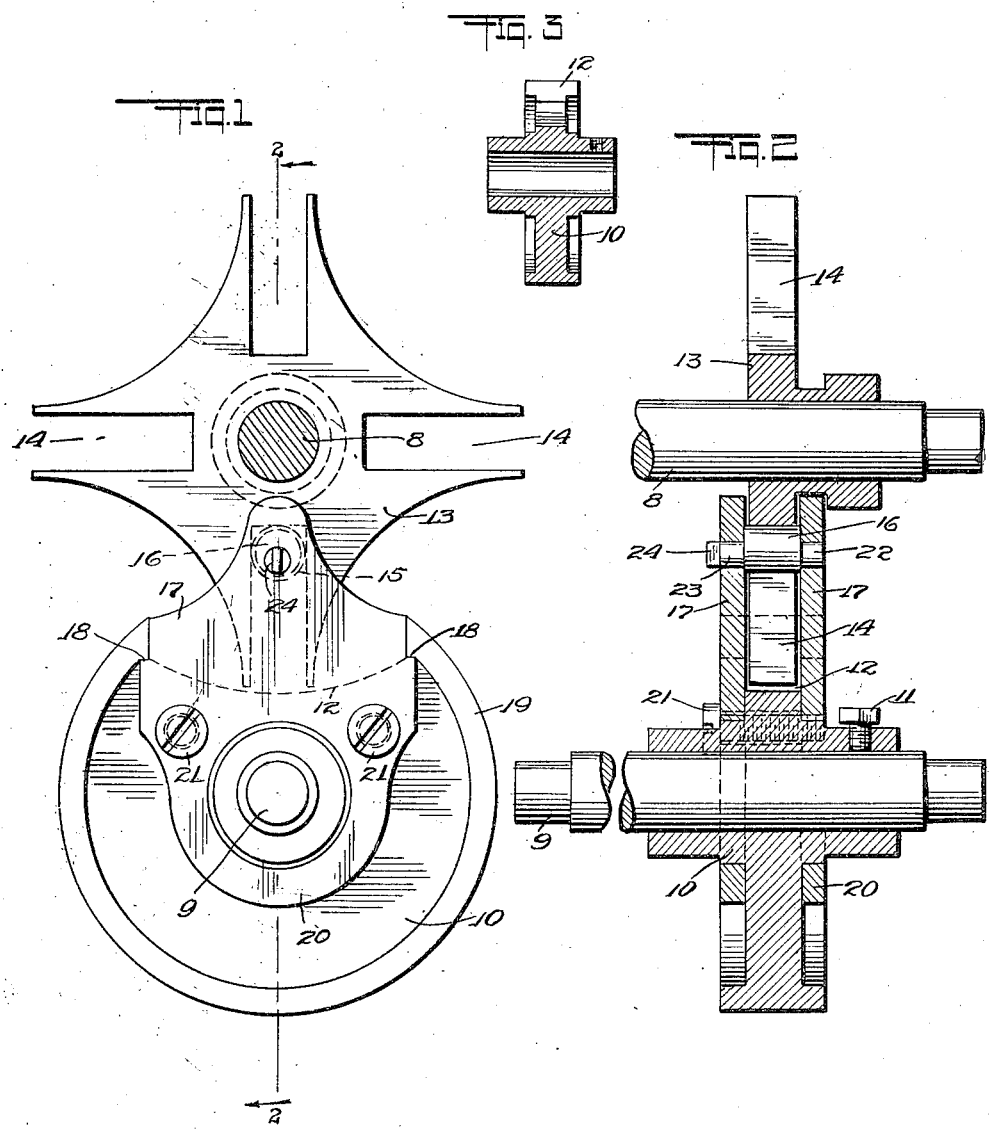
INVENTOR
A. Kershaw
BY
ATTORNEY Patented Aug. 5, 1924.

1,503,793

UNITED STATES PATENT OFFICE.

ABRAHAM KERSHAW, OF SCARBOROUGH, ENGLAND.

INTERMITTENT MOVEMENT FOR PROJECTORSCOPES.

Application filed November 4, 1921. Serial No. 512,773.

*To all whom it may concern:*

Be it known that I, ABRAHAM KERSHAW, a subject of the Kingdom of England, and a resident of Teddington Rise, Raincliffe Avenue, Scarborough, England, have invented certain new and useful Improvements in Intermittent Movements for Projectorscopes, of which the following is a specification.

Among the principal objects which the present invention has in view are: to adjust the working position of the member for engaging a Geneva wheel; to compensate for wear thereof; and to rapidly replace or repair the driving mechanism of an apparatus employing a Geneva wheel to secure intermittent movement.

Drawings.

Figure 1 is a side view of cooperating members for producing an intermittent transmission of rotary motion.

Figure 2 is a sectional view, the section being taken on the line 2—2 in Fig. 1.

Figure 3 is a detail view on reduced scale of the master wheel of the intermittent movement.

Description.

The intermittent movement herein disclosed is employed principally for the transmission of rotary motion to a driven shaft 8 from a driving shaft 9. The driving shaft 9 is driven continuously at a constant speed. A wheel 10 rigidly held thereon by a set screw 11 has a recess 12 formed therein for the passage of the extensions of the Geneva or intermittent wheel 13. The extensions of the wheel 13 are slotted to form the channels 14, the inner ends whereof are adjacent the shaft 9 or the bearing of the wheel 10 to fit the channels 14. A sleeve 15 is rotatably mounted on a driving pin 16. The sleeve 15 may be regarded as a wear member to be replaced if it becomes worn sufficiently to cause a vibration in the transmitted rotation to the shaft 8.

The pin 16 is mounted between clamp plates 17. The plates 17 are recessed to provide registering shoulders 18 which engage the flange 19 of the wheel 10 at the inner side thereof. A centrally opened extension 20 has perforations to receive the contracting screws 21. The screws 21 extend through perforations provided in one of the plates 17 and in the wheel 10 to engage tapped perforations in the other plate 17. By setting up the screws 21 the plates 17 may be clamped or drawn towards each other rigidly upon the pin 16.

The pin 16 has eccentric trunnion bearings 22 and 23. The bearing 23 extends slightly beyond the plate 17 with which it is associated and is provided with the flattened portions 24 by which it may be engaged for rotating the pin 16.

It is obvious that as the pin 16 is turned on the eccentric bearings formed by the trunnions 22 and 23, the point of engagement of the pin 16 and the Geneva wheel 13 is changed or regulated. In this manner a closer timing of the transmission is effected, and wear of the engaging parts is compensated for.

Claims.

1. An apparatus as characterized comprising a Geneva wheel; a constantly rotated driving wheel disposed in a plane coincident with said Geneva wheel; a plurality of bearing members contractibly mounted on said driving wheel; a driving pin mounted in said members; means for clamping said members on said pin; and means whereby said pin may be rotated.

2. An apparatus as characterized comprising a constantly driven mutilated driving wheel, the said wheel having a peripherally opening recess, the wall whereof is parallel with the path of a Geneva wheel cooperating with said driving wheel; a plurality of clamping members contractibly mounted on said driving wheel, said members having mutually aligned bearings, an eccentric driving pin mounted in said bearings; and means for contracting said clamping members on said pin to hold the same immovable.

3. An apparatus as characterized comprising a constantly driven mutilated driving wheel, the said wheel having a peripherally opening recess, the wall whereof is parallel with the path of a Geneva wheel cooperating with said driving wheel; a plurality of clamping members contractibly mounted on said driving wheel, said members having mutually aligned bearings, an eccentric driving pin mounted in said bearings; and means for contracting said clamping members on said pin to hold the same immovable, said means embodying contracting screws thread-engaged with one of said clamping members and frictionally engaging the other of said clamping members.

ABRAHAM KERSHAW.